March 21, 1933.  O. HEGEMANN  1,902,701
SHIP DRIVE COUPLING MECHANISM
Filed April 8, 1930
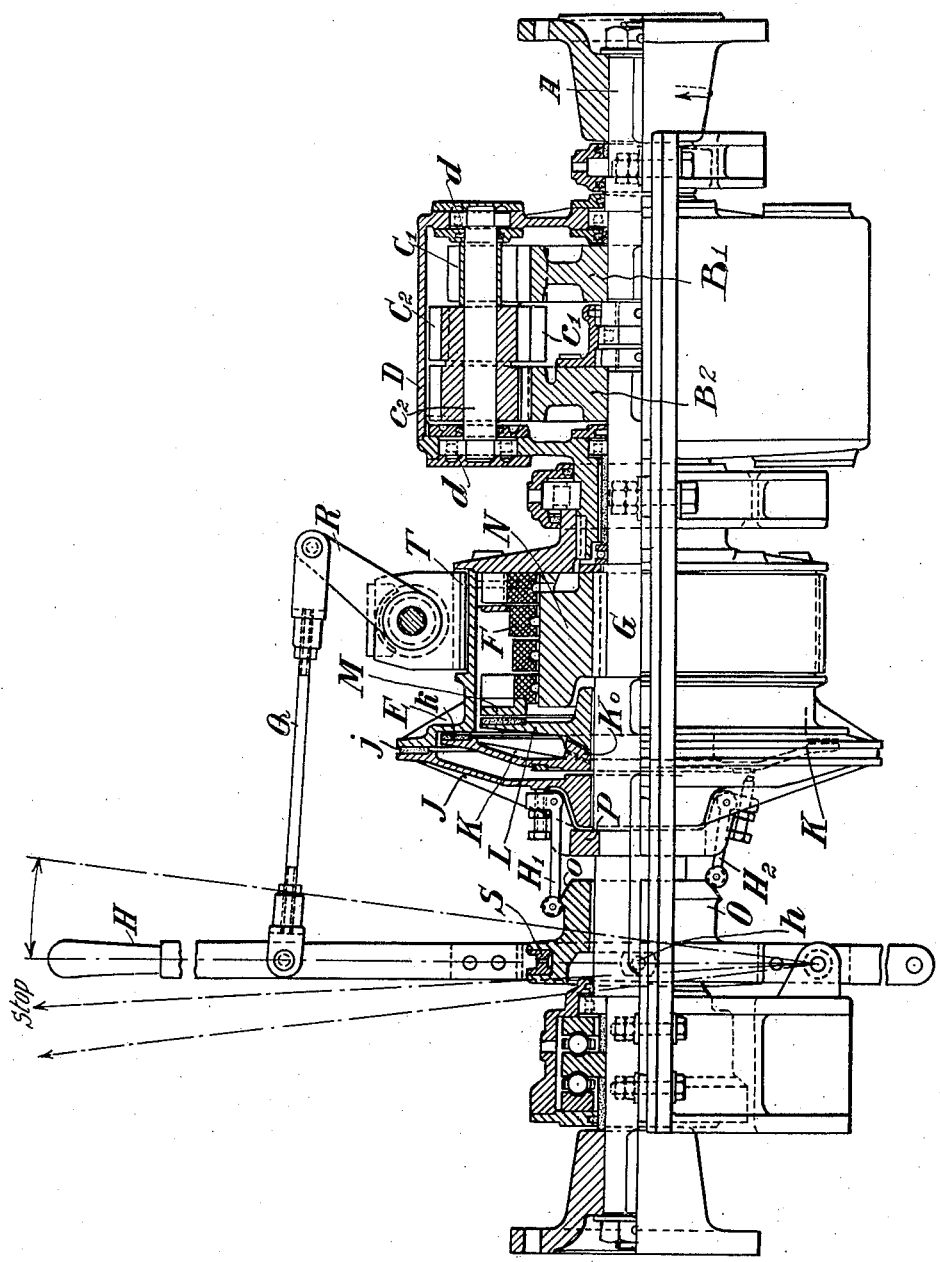
Inventor
Otto Hegemann
By Dowell and Dowell
Attorneys Patented Mar. 21, 1933

1,902,701

UNITED STATES PATENT OFFICE

OTTO HEGEMANN, OF DORTMUND, GERMANY, ASSIGNOR OF ONE-HALF TO DORTMUNDER VULKAN A. G., OF DORTMUND, GERMANY, A CORPORATION OF GERMANY

SHIP DRIVE-COUPLING MECHANISM

Application filed April 8, 1930, Serial No. 442,699, and in Germany June 24, 1929.

In operating large coupling mechanisms with helical-band friction couplings, and more particularly those of ship's reversing gear, it has been found that the engagement of the member to be driven does not take place sufficiently smoothly, but rather suddenly, this being due to the capstan-like action of the helical-band-coupling, which does not allow of any prolonged slip. It has frequently been attempted to avoid this defect by replacing the usual clutch lever serving for tightening the helical-band by a brake-disc, which together with its clutch disc constituted a so-called auxiliary coupling. This auxiliary means, however, has not had the desired result, so that in very many cases with more sensitive drives the further use of such helical-band couplings with auxiliary couplings had to be discontinued. Success could not follow these attempts and researches because the brake-disc could not operate upon the sensitive helical-band in any other way than the clutch-lever formerly used. The helical-band acts just like the rope on a ship's capstan. It quickly winds up on the barrel even with slight tension at the free end, whereby it then straightway carries with it the member to be driven. Thus it is immaterial whether this pull on the free end is exerted by a clutch-lever, by a brake-disc or by any other member acting as a pulling, braking or the like member.

Furthermore the helical-band coupling, operating like a capstan, has the great disadvantage, as compared with other direct-acting friction-couplings, of being inevitably destroyed by prolonged slip, since in this case the steel band, which is under very great surface pressure upon the chilled cast barrel, becomes very hot, even if most efficiently lubricated, and consequently distorts and seizes, so that the coupling can no longer be thrown out of gear. Nearly all the damage arising in working with helical-band couplings can be traced either to the above mentioned frequently impulsive engagement of the helical-band coupling (owing to which even breakage of strong members of the machine may occur) or to the natural consequence of a prolonged slip of the coupling owing to insufficient clutch pressure, such as always occurs, if in the case of mechanical clutch mechanisms or those limited by notches or the like, after the friction surfaces have worn to some extent it has become impossible of adjustment, at the right time, and moreover the more readily if the coupling is thrown into gear under light load, and subsequently after a short time the torque increases up to full load, as is the case for example in ship-propulsion. But on the other hand, ship-propulsion demands the possibility of proceeding at times with a slipping coupling, for example when manœuvring or towing in restricted places in shallow waters for the prevention of breaking of the propeller, and especially when using the mechanism in tugs and fish-carriers, when it must come into gear quite slowly. An efficient helical-band coupling, especially for ship reversing gear, which surely prevents slipping of the coupling when thrown into gear, has not yet been devised. Similarly, quite as desirable as the foregoing is a slipring release in combination therewith, as is a matter of course with all friction couplings coming into consideration.

All deficiencies in the working of helical-band couplings are removed by my present invention. The inevitable shock on engaging is very considerably moderated and practically removed by the arrangement of an auxiliary coupling constructed as a slip-coupling, which itself takes up the acceleration of the stationary masses to be driven, and which has to transmit a quite considerable torque when the helical-band coupling is thrown in, the operation of which itself causes the slowly increasing engaging pressure on the helical-band required for the desired torque. If any slipping of the helical-band coupling should occur during working, this mechanism at once comes automatically into operation. The slipring with the hand lever is freed from load. In the construction of the coupling mechanism as a reversing gear the intermediate pinions are carried in roller or ball bearings provided with continuous lubrication, by which means the usual oil-bath or forced lubrication means for these inaccessible bearings, which so easily get out of order, can be dispensed with.

The accompanying drawing shows a practical example of construction according to my invention as applied to a slip reversing gear, the same being half in longitudinal section and half in elevation and in the commencing position with the slip coupling engaged and with the helical-band coupling still unengaged.

Referring to said drawing, A is the driving shaft which is put in permanent connection with the prime mover (not shown), and G is the driven shaft, which in ship propulsion connects with the shaft carrying the propeller. As regards the position of the prime mover and of the propeller on the ship, the direction towards the right will be termed "ahead" and that towards the left "astern".

The hand-lever H serves for the control of the coupling and when said lever is drawn to the position marked "stop", the gear is thrown out of action. With the lever in this position the shaft A, through a pinion $B^1$ keyed thereon drives a pair of long pinions $C^1$ which are journalled in the casing D at diametrically opposite positions, but only the right hand one of which shows in the drawing, as the left hand one is located behind $C^2$. These pinions $C^1$ by means of the part $c^1$ projecting beyond the pinion $B^1$ to the left of the gearing are in mesh with a pair of long pinions $C^2$ similarly journalled in the casing D, and one of which is shown in axial section in the drawing. The pinion $C^2$ is keyed on a shaft $c^2$ whose ends are carried in ball or roller bearings $d$ in the casing, and the bearings for the pinions $C^1$, which are not shown in the drawing, are arranged similarly. The left-hand halves of the pinions $C^2$ mesh with a sun-wheel $B^2$ keyed on the shaft G. When the coupling is declutched, it happens in the known way that by means of this sun and planet gear $B^1$, $C^1$, $B^2$ the casing D rotates at half the speed of the shaft A, since the shaft G to be driven and therefore also the pinion $B^2$ are at rest.

The coupling casing E is rigidly connected with the casing D, and the helical band F is attached to its right-hand surface. These two members therefore also rotate when the coupling is declutched, at half the speed of the prime mover and the helical band F envelopes the chilled iron barrel N which is keyed on the shaft G with some clearance.

If the gear is to be moved from the position of rest to "ahead", the hand-lever H is moved to the right, i. e. forward in this case of a ship's coupling. It carries with it by means of pins $h$ in the known way an engaging sleeve O which is provided at its front end with an inclined surface $o$, and is slidable on the shaft G by means of slot and feather attachment. A friction disc J similarly slidable by means of slot and feather is attached to the shaft G to be driven. This disc can be displaced by cranked levers $H^1$ pivoted on a ring P keyed on the shaft. These lever arms $H^1$ and other shorter levers $H^2$ are in fact arranged in pairs in such a way that they are balanced against each other. It is only for the sake of clearness that in the drawing one lever $H^2$ is shown as located diametrically opposite to a lever $H^1$. On the displacement of the hand-lever H in the first place, the longer levers $H^1$ rest by rollers at their free ends upon the inclined surface $o$ of the sleeve and slide up on it. By this means the adjustable shorter ends of said cranked levers ($H^1$) are pressed against the friction disc J to move the latter together with the friction pad $j$ provided thereon against the left-hand surface of the rotating coupling casing E, so that it will then be carried forward with a slipping action. It should be remarked here that the overall efficiency of this friction coupling amounts to about 20 to 30 per cent of the output of the prime mover.

The transmitting action exerted by friction upon the disc J is communicated through the slot and feather to the shaft G, so that this latter and with it the helical band and all other members are set in motion without any shock whatever. As soon as the shaft G is in motion, the rotation is transmitted to the pinion $B^2$, which hitherto had been at rest, and thus an acceleraton of the members D, E, F hitherto rotating at half-speed is brought about.

If the hand-lever H be moved further in the "ahead" direction, the throw-in sleeve O now also operates the shorter cranked levers $H^2$ and presses their adjustable shorter ends against a brake disc K which is rotatable and slidable on the shaft G, said brake-disc being provided with a friction pad $k$ and being pressed against a surface on the rear wall of the casing E. This casing E, which as stated above, now rotates more quickly than before, causes a rotation of the disc K. On its inner periphery at $K^o$ the disc is provided with helically shaped continuous cam surfaces or teeth and with these teeth there meshes another set of teeth on a disc L, which is arranged slidably but unrotatably on the shaft G. On the rotation of the disc K, the cams or teeth sliding on each other at $K^o$ exert an axial thrust upon the disc L. By this means a known and above-mentioned "auxiliary coupling" for the helical band F is brought into operation. In the example illustrated this consists of a brake-disc M located on the free end of the spring, against which works a friction pad on the periphery of the disc L on its being displaced axially. Finally by the displacement of the disc L on the disc M rotating at higher speed a braking action is exerted on the free end and by this means the end of the helical band F is obviously drawn up smoothly and easily. It coils itself as in a capstan around the barrel N rotating more slowly with the shaft G, so that the barrel together with the shaft G is brought up to the full speed of the prime mover without appreciable shock. The clutching action of the disc K increases until a relative speed is established between said disc and the casing E and until the clutching pressure reaches the normal maximum when both members rotate at the same speed, i. e. when the helical band coupling has fully gripped. The clutching action increases further automatically in the event that the driven part N of the helical band coupling lags behind the driving part E in the least degree owing to any circumstance. By this means further slipping is avoided under all circumstances.

A considerable part of the clutch pressure, which must be employed to bring the helical band coupling into action, is derived in the way described from the power of the prime mover itself.

In place of the cam surfaces or teeth at $K^o$ causing the axial displacement between the members K and L, a high-pitched thread could as well be used with resultant similar action between the two members, as will be obvious to any one skilled in the art.

The throwing-in of the coupling takes place without depending upon the dexterity of the operator of hand-lever H. The occurrences described take place perforce in every case; even on the quickest throwing-in of the gear, the acceleration of the masses connected with the shaft to be driven is at first taken up by the slip coupling between J and E.

For going "astern" the lever H is moved from the stop position towards the left or backwards. Thereby the lever acts by means of a draw-bar Q and a swinging arm R to tighten a brake-band T, which surrounds the casing E rotating unloaded. The casing is thus brought gradually to rest. The gear casing D is thus also braked, and through the pinions journalled in this casing the pinion $B_2$ is driven by the pinion $B_1$ through the intermediate pinions $C_1$ and $C_2$, (which are now prevented from rotating), in the opposite direction to the direction of rotation of the shaft A, at the full speed of the prime mover. A shockless coupling is secured by the braking in equal measure as with the slip coupling for going ahead.

Since the slip ring S, upon which the pins h of the hand-lever act, is always unloaded, the hand-lever requires no special stop in any position.

My invention is not limited to the particular construction illustrated and described of the main coupling and slip coupling, but modifications may be introduced without exceeding the scope of my invention.

Having now particularly described and ascertained the nature of my said invention and in what manner the same is to be performed I declare that what I claim is:—

1. In a ship's reversing gear mechanism embodying a helical-band coupling and a rotating casing, a pair of slip-clutch elements movable separately into frictional drive contact with the casing and a plate-member with which one of the same in so moving engages; said plate-member being in turn actable on the helical-band part of the coupling and actuated by said one of the slip-clutch elements to bring the same into operation or engagement after its rotative part has first been set in motion.

2. A clutch device embodying a housing rotatable by a driving shaft, a driven shaft rotatably supported in the housing and a coupling between said driving and driven shafts, comprising a helical-band carried by said housing, a drum on the driven shaft, a plurality of slip-clutch elements slidable on the driven shaft into frictional contact with said housing and one of said elements being free on said shaft, a plate-member likewise slidable on the aforesaid shaft with which said free one of said elements in so sliding engages, a surface on one end of the helical-band against which said plate-member upon engagement frictionally bears to bring the same into engagement with said drum first set into motion by the clutch elements, and means for sliding said clutch elements into contact with said housing.

3. A clutch device embodying a housing rotatable by a driving shaft, a driven shaft rotatably supported in the housing and a coupling between said driving and driven shafts, comprising a helical-band carried by said housing, a drum on the driven shaft, a slip-clutch element slidably keyed on the driven shaft for movement into frictional contact with said housing, a second slip-clutch element loosely slidable on said shaft for movement likewise into frictional contact with said housing, a plate-member also slidably keyed on said shaft with which the second-named clutch element in so moving engages with a forwarding movement, a surface on the helical-band against which said plate-member upon engagement frictionally bears so as to draw the same engageably around said drum after the latter has first been set into motion by the first-named clutch element, and means for moving said clutch elements into and out of engagement with said housing.

4. A clutch device embodying a housing rotatable by a driving shaft, a driven shaft rotatably supported in the housing and a coupling between said driving and driven shafts, comprising a helical-band carried by said housing, a drum on the driven shaft, a clutch element slidably keyed on the driven shaft for movement into a slipping frictional contact with said housing so as to thereby impart rotation to said shaft at a speed less than the housing, and clutching means between said housing and the helical-band for thereafter drawing the latter into binding engagement around said drum.

5. A clutch device embodying a housing rotatable by a driving shaft, a driven shaft rotatably supported in the housing and a coupling between said driving and driven shafts, comprising a helical band carried by said housing, a drum on the driven shaft, a clutch element slidably keyed on the driven shaft for movement into a slipping frictional contact with said housing so as to thereby impart rotation to said shaft at a speed less than the housing, and clutching means between said housing and shaft and between said shaft and helical-band for bringing the latter into operation only after the shaft has been set in motion at a gradually increasing speed less than the speed of said housing.

6. A clutch device embodying a housing rotatable by a driving shaft, a driven shaft rotatably supported in the housing and a coupling between said driving and driven shafts, comprising a helical-band carried by said housing, a drum on the driven shaft, a clutch element slidably keyed on the driven shaft for movement into a slipping frictional contact with said housing so as to thereby impart rotation to said shaft at a speed less than the housing; a second clutch element loosely slidable on said shaft for movement likewise into a slipping frictional contact with said housing, a plate-member slidably keyed on said shaft with which the second-named clutch element in so moving engages with a forwarding movement simultaneously accelerating the shaft's speed, a surface on one end of the helical-band against which said plate-member upon engagement with forwarded movement frictionally bears so as to actuate the same bindingly around said drum after the latter has been set in motion at a gradually increasing speed less than the speed of the housing, and means for moving said clutch elements into and out of engagement with said housing.

In testimony whereof I affix my signature.

OTTO HEGEMANN.